United States Patent
Kneer

(10) Patent No.: US 7,585,452 B2
(45) Date of Patent: Sep. 8, 2009

(54) METHOD AND DEVICE FOR PRODUCING A CONTAINER

(75) Inventor: Stephan Kneer, Farchand (DE)

(73) Assignee: Gaplast GmbH, Altenau (DE)

( * ) Notice: Subject to any disclaimer, the term of this patent is extended or adjusted under 35 U.S.C. 154(b) by 0 days.

(21) Appl. No.: 12/282,999

(22) PCT Filed: Jan. 24, 2007

(86) PCT No.: PCT/DE2007/000117

§ 371 (c)(1),
(2), (4) Date: Sep. 29, 2008

(87) PCT Pub. No.: WO2007/104274

PCT Pub. Date: Sep. 20, 2007

(65) Prior Publication Data

US 2009/0039549 A1  Feb. 12, 2009

(30) Foreign Application Priority Data

Mar. 16, 2006 (DE) .................. 10 2006 012 487

(51) Int. Cl.
*B29C 45/14* (2006.01)
*B29C 39/02* (2006.01)
*B29C 45/00* (2006.01)
*B29C 47/00* (2006.01)
*B29C 49/08* (2006.01)
*B29C 67/00* (2006.01)
*B29D 22/00* (2006.01)
*B29C 49/00* (2006.01)

(52) U.S. Cl. .................... 264/515; 264/529; 425/523; 425/535; 425/536

(58) Field of Classification Search .................. 425/523
See application file for complete search history.

(56) References Cited

U.S. PATENT DOCUMENTS 6,244,852 B1 * 6/2001 Kneer .................. 425/522

FOREIGN PATENT DOCUMENTS

| DE | 196 26 968 A1 | 1/1998 |
| DE | 196 26 976 A1 | 1/1998 |
| JP | 08-175568 | 8/1996 |

OTHER PUBLICATIONS

German Translation of Japan 08-175568, Aug. 9, 1996.
International Search Report (in German), Jan. 24, 2007.
Written Opinion of the ISA (in German), Jan. 24, 2007.

* cited by examiner

*Primary Examiner*—Christina Johnson
*Assistant Examiner*—Benjamin Schiffman
(74) *Attorney, Agent, or Firm*—Greer, Burns & Crain, Ltd.

(57) ABSTRACT

The method comprises the following steps; a) the container opening is seated, b) at least one wall opening is created by drilling through or piercing the wall of the outer container using a drill, graver or needle, a pressurised medium being introduced into the gap between the outer container and the inner tube, once the wall of the outer container has been fully penetrated, c) the advance of the drill or needle is halted as soon as a predetermined first pressure threshold has been reached in the inner tube, d) the introduction of the pressurised medium into the gap between the outer container and the inner tube is halted as soon as a predetermined second pressure threshold has been reached in the inner tube, e) once the pressure in the gap between the outer container and the inner tube has been relieved, a pressurised medium is introduced into the inner tube through the container opening, in order to place the inner tube against the container wall again after it has been detached from the latter. The method allows the inner tube to be detached in a controlled manner with a high degree of uniformity from the outer container and to be placed against said outer container again without a significant inclusion of air.

9 Claims, No Drawings

METHOD AND DEVICE FOR PRODUCING A CONTAINER

CROSS-REFERENCE

This application is a Section 371 national stage of International Application No. PCT/DE2007/000117 filed Jan. 24, 2007, which claims priority from German Application No. 10 2006 012 487.1 filed Mar. 16, 2006.

FIELD OF THE INVENTION

The present invention relates to a method for producing a container consisting of a substantially stiff outer container and an easily deformable inner pouch which are made from thermoplastic materials that do not form a heat-sealed or welded joint with one another, the container comprising a container opening and the outer container at least one wall opening by which pressure is compensated in the space between the inner pouch and the outer container when the inner pouch contracts due to the discharge of its contents. In the method, a parison, which consists of at least two tubings, is coextruded and arranged between the opened halves of a blow mold, the blow mold being closed when the parison has reached the length required for producing the container. Excess material is squeezed off in the bottom area of the container to be produced and, preferably, an outwardly projecting web is formed from welded material of the outer container, in which web the welded bottom seam of the inner pouch is clamped and held in axial direction. The parison is then inflated by a pressure medium, in general compressed air, for contact with the wall of the blow mold and is removed from the blow mold.

BACKGROUND

Such a method is e.g. known from DE 196 26 967 C2. It is also disclosed in this document that the at least one wall opening is formed in that the wall of the outer container is pierced or punctured by a drill, graver or a piercing needle, a pressure medium being blown or injected against the wall of the inner pouch after complete penetration of the wall of the outer container to press the pouch back so that it is not damaged by the drill or piercing needle. The pressure medium may be air, gas, water or a gel.

Although the different thermoplastic materials of the outer container and the inner pouch do not form a welded joint with one another, they adhere to each other when the container is produced in a coextrusion process according to the above-described method. Before such a container can be used, i.e. before being filled with a liquid or, for example, also gel-like container contents which is then gradually discharged, for example, by means of an airless pump or in the case of a squeeze container by the container being squeezed, the inner pouch must be removed or detached at least for its greatest part from the wall of the outer container and must then be placed on the wall again. This has so far been done by applying a negative pressure or vacuum to the inner pouch through the container opening, the inner pouch thereupon contracting suddenly. In this process the inner pouch which is clamped with its bottom seam in the bottom web of the outer container detaches from the outer container in a more or less uncontrolled manner, and it may e.g. happen that the inner pouch only detaches at one side. Subsequently a pressure medium, in general compressed air, is introduced through the container opening into the inner pouch to bring said pouch again into contact with the outer container so that the inner pouch has the intended filling volume. When the container has the shape of a bottle with a neck which passes through shoulder sections into the e.g. cylindrical body of the outer container, it is often unavoidable under the known procedure that air gets entrapped in the transition area of the shoulder to the main body of the outer container between the outer container and the inner pouch, which air can no longer escape. This also happens whenever the body of the outer container does not extend along a straight line, e.g. cylindrically, but has indentations and bulges.

In cases where the inner pouch has not been detached from the wall of the outer container in a substantially uniform manner, a relatively high negative pressure arises, despite pressure compensating openings in the wall of the outer container, in the inner pouch due to the discharge of filling material. The higher this negative pressure, the greater is the permeation through the wall of the inner pouch and the greater is the risk that the pouch will leak. If the negative pressure in the inner pouch is too high, this may entail inoperativeness of the pump, which is most of the time provided, so that it is not possible to discharge the whole contents of the container. It may also happen that the negative pressure is so high at the beginning that outer bottle and inner bottle will fold at the same time until the negative pressure reaches a value which enables the inner pouch to detach suddenly.

SUMMARY OF THE INVENTION

It is the object of the present invention to develop a method of the above-mentioned kind such that the inner pouch can be detached in a controlled manner and as uniformly as possible from the outer container and can again be placed against the outer container substantially without the inclusion of air (or of another pressure medium) between the inner wall of the outer container and the inner pouch.

Moreover, a device shall be indicated for producing the container with these properties.

Said objects are achieved according to the invention claimed hereinafter.

DETAILED DESCRIPTION OF THE PREFERRED EMBODIMENTS

After manufacture of the container in the blow mold and its removal, the method of the invention provides the following steps, which are preferably carried out in the device of the invention:

a) The container opening is sealed, which is preferably done by means of a plug which is tightly pressed into the container opening, mostly a container neck. Thereupon, the at least one wall opening is formed in a manner known per se in that the wall of the outer container is penetrated or punctured by a drill or a piercing needle, and once the wall of the outer container has been fully penetrated, a pressure medium, preferably compressed air, is introduced into the space between the container and the inner pouch. The pressure medium is preferably ejected from a channel at the head end of the drill or the piercing needle and blown against the opposite area of the inner pouch which is pressed back by the medium subjected to a high pressure. As a result, the internal pressure in the inner pouch rises. The pressure in the inner pouch is preferably sensed by a pressure sensor arranged therein. If a predetermined first pressure threshold value, which is preferably in a very small order of about 0.05 bar, has been reached and sensed by the sensor, a control device immediately stops the advance movement of the drill or the piercing needle, thereby reliably preventing damage to the wall of the inner pouch. The introduction of the pressure medium into the space between the outer container and the inner pouch will be continued until a predetermined second pressure threshold value is sensed in the inner pouch, said second pressure threshold value being indicative that the inner pouch has detached from the outer container to the desired extent and up to the intended container height. Once the second threshold value, which may e.g. be 0.15 bar, has been reached, the introduction of the pressure medium into the space between the outer container and the inner pouch is stopped.

While the first pressure threshold value is set to be so low that it virtually corresponds to the first measurable pressure rise in the inner pouch that indicates that the drill or the piercing needle or an appropriate tool has penetrated the wall of the outer container, the second pressure threshold value is defined in response to the container size, the container shape, the material used, etc. such that an optimum detachment of the inner pouch takes place.

If the container has e.g. sharp-angled edges, as may occur in broad shoulder regions of a bottle, especially when the shoulder regions extend at a right angle relative to the circumferential wall of the container or if the container comprises bulges or constrictions where there is the risk that air will be entrapped at said places when the further upwardly detached inner pouch is again pressed against the container wall, the second threshold value is set at such a level that the detachment process is stopped before the critical ranges are reached. The associated pressure threshold value can be determined in corresponding tests. The second threshold value must always be matched with the respective container type.

When the process of introducing the pressure medium into the space between the outer container and the inner pouch is stopped and the detachment process is thus terminated, said space is pressure-relieved in that the drill or the piercing needle is expediently retracted from the hole in the wall.

In a preferred embodiment of the method, steps b) through d) are carried out twice in that a wall opening is formed preferably at both sides of a plane comprising the bottom seam and the central longitudinal axis of the container and the pressure medium is introduced there. It is here within the scope of the invention that it is also possible to form more wall openings at both sides of the plane and the steps of the invention can be carried out more often in a corresponding manner.

The wall openings may here be formed virtually on every portion of the outer container, e.g. on the bottom, the two wall openings or holes being expediently opposite each other along a line which bisects the bottom seam and extends at a right angle relative thereto. The formation of the wall openings approximately at half the height in the circumferential wall of the outer container is particularly expedient if a squeeze type container is concerned in the case of which the contents of the container is not discharged by an airless pump, but is discharged by squeezing the outer container. The two wall openings can here be closed by the user's fingers to facilitate the discharge of the container contents.

Of course, the container openings may also be formed in the shoulder region.

With particular advantage the inventive steps b) to d) are carried out one after the other only on one wall opening, and these steps are then taken for the other wall opening(s).

Once the inner pouch has been detached on all wall openings to the desired extent after completion of the method steps b) through d), a pressure medium is introduced into the inner pouch through the container opening, e.g. through the plug in the bottle neck, after pressure relief of the space between the outer container and the inner pouch so as to place the inner pouch, which has detached from the container wall, against said wall again. To this end it is suggested with great advantage that a predetermined volume of a medium subjected to a predetermined pressure should be introduced into the inner pouch in that a biased compressed-air source is connected to the interior of the inner pouch by opening a valve, and that the pressure produced thereby in the inner pouch should be measured. This measurement value of the pressure is in correlation with the filling volume of the inner pouch and shows whether, as intended, said pouch has come into full contact with the outer container or whether air inclusions have reduced the filling volume, whereby the container would become useless (if an associated tolerance limit is exceeded).

Furthermore, the progress of said internal pressure is measured, which is indicative whether the inner pouch is leak-proof.

Such a quality control of the volume and leak test is carried out in the device of the invention on every container and represents an important aspect of the present invention.

In further details, it is suggested that a respective bulge of the outer container should each time be formed in the blow mold in the area of the intended wall openings, e.g. in the form of a flat spherical section with a corresponding inner indentation on which the inner pouch rests. When the drill has penetrated said spherical cap-shaped wall section in a direction perpendicular to or at an inclined angle relative to the wall surface and the pressure medium is blown against the also spherical cap-shaped section of the inner pouch, the last-mentioned section will suddenly fold inwards, whereby contact with the drilling tool or graver is reliably prevented.

The apparatus of the invention preferably includes two separated drilling stations with a controlled drive and a controlled fast advance movement, the angle of incidence of the drilling tools and their position being adjustable.

Under a further advantageous aspect of the invention, compressed air is introduced into the inner pouch following step a), i.e. after sealing of the container opening by means of an appropriate plug, a pressure being here built up that is smaller than the pressure of the medium introduced into the space between the outer container and the inner pouch. This counter-pressure acts as a buffer which prevents a situation where the inner pouch is "shot away" upwards in an undesired manner, for example, beyond an edge of the container by the compressed air introduced into the space between the outer container and the inner pouch. The detaching operation is carried out in a particularly controlled uniform manner by the counter-pressure inside the inner pouch. The internal pressure can be relieved or reduced with an increasing detachment of the inner pouch and thus accompanying volume reduction, e.g. by means of an appropriate valve, which however need not necessarily be the case. After the counter-pressure has been built up, the pressure sensor is expediently set to zero.

Hence, the inner pouch is detached in preferably two separate cycles operating with the same or different pressure threshold values that must be defined before the method is carried out.

Each of the sealing plugs that are expediently used for sealing the container opening is preferably provided with a hole for a sensor provided in the inner pouch, or for the line thereof, and for an air counter-pressure valve by which the compressed air is introduced into the inner pouch. The counter-pressure acting as the buffer may be up to about 0.2 bar, depending on the container. In an alternative embodiment, only one opening is provided with a switch valve.

The device of the invention comprises a container transfer station which is either of a manual or automatic kind or communicates with the blow molding machine. At an insertion station the containers are inserted into a workpiece carrier. For example four containers are here arranged in a row onto which a transverse yoke moves down from above and seals the container with the sealing plug. Furthermore, the device according to the invention preferably comprises two drilling stations, one station for volume testing, one station for leak testing and preferably a camera station for checking the sealing surface and the detachment height, and a chip sucking device. Furthermore, the outlet of the apparatus is provided with a good/poor quality switch for quality assurance, those containers being sorted out as "poor" that have not passed the volume and/or leak test and in the case of which the second pressure threshold value has not been reached, so that the inner pouch has here not detached to an adequate degree.

Moreover, the pressure values are collected by a data acquisition means of the device during drilling and in the volume and leak test.

The materials used for the outer container are for example PP, PET-G and Surlyn whereas the materials for the inner pouch may e.g. be Lupolen or Surlyn. The inner pouch may e.g. consist of three layers, e.g. EVOH, bonding agent layer, Surlyn or Lupolen. It goes without saying that this information on the materials is only by way of example and not limiting.

The invention claimed is:

1. A method for producing a container consisting of a substantially stiff outer container and an easily deformable inner pouch which are made from thermoplastic materials that do not form a welded joint with one another, the container comprising a container opening and at least one wall opening in the outer container, by which pressure is compensated in the space between the inner pouch and the outer container, a parison, which consists of at least two tubings, being coextruded and arranged between the opened halves of a blow mold and the blow mold being closed when the parison has reached the length required for producing the container, excess material being squeezed off in the bottom area of the container to be produced, and a web being formed from welded material of the outer container, in which web the welded bottom seam of the inner pouch is clamped and held in axial direction, and the parison being inflated by a pressure medium for contact with the wall of the blow mold and removed from the blow mold, the method comprising the following steps:
   a) the container opening is sealed,
   b) the at least one wall opening is formed in that the wall of the outer container is punctured or penetrated by a drill, graver or a piercing needle, with a pressure medium being introduced into the space between the outer container and the inner pouch after full penetration of the wall of the outer container,
   c) the advance movement of the drill or the piercing needle is stopped as soon as a predetermined first pressure threshold value has been reached in the inner pouch,
   d) the introduction of the pressure medium into the space between the outer container and the inner pouch is stopped as soon as a predetermined second threshold value has been reached in the inner pouch,
   e) after pressure relief in the space between the outer container and the inner pouch a pressure medium is introduced into the inner pouch through the container opening to place the inner pouch, which has detached from the container wall, against said wall again.

2. The method according to claim 1, wherein at least one wall opening is formed at both sides of the plane extending through the bottom seam and the central longitudinal axis of the container.

3. The method according to claim 1, wherein in the blow mold in the area of the wall openings a respective bulge of the outer container is formed with an inside on which the inner pouch rests.

4. The method according to claim 1, wherein steps b) through d) are carried out for each wall opening individually in such a manner that the inner pouch is first detached at the one side of the plane extending through the bottom seam and the longitudinal central axis and then at the other side.

5. The method according to claim 1, wherein the pressure threshold values are sensed by a pressure sensor which is arranged in the inner pouch.

6. The method according to claim 1, wherein a pressure which is smaller than the pressure of the medium introduced into the space between the outer container and the inner pouch is built up in the inner pouch following step a).

7. The method according to claim 1, wherein a device senses up to which level the inner pouch has detached from the wall of the outer container.

8. The method according to claim 1, wherein a predetermined volume of a pressure medium is introduced into the inner pouch and that the pressure produced thereby is measured in the inner pouch.

9. The method according to claim 8, wherein the progress of the internal pressure is measured for sensing a possible drop in pressure.

* * * * *